United States Patent
Jackson et al.

(10) Patent No.: US 9,512,782 B2
(45) Date of Patent: Dec. 6, 2016

(54) GAS TURBINE ENGINE END-WALL COMPONENT

(71) Applicant: ROLLS-ROYCE PLC, London (GB)

(72) Inventors: Dougal Jackson, Derby (GB); Paul Ashley Denman, Swadlincote (GB); Vivek Ross Savarianadam, Loughborough (GB)

(73) Assignee: ROLLS-ROYCE plc, London (GB)

( * ) Notice: Subject to any disclaimer, the term of this patent is extended or adjusted under 35 U.S.C. 154(b) by 360 days.

(21) Appl. No.: 14/071,004

(22) Filed: Nov. 4, 2013

(65) Prior Publication Data
US 2014/0123676 A1 May 8, 2014

(30) Foreign Application Priority Data

Nov. 2, 2012 (GB) .................................. 1219731.5

(51) Int. Cl.
*F02C 7/18* (2006.01)
*F01D 9/04* (2006.01)
*F01D 25/08* (2006.01)

(52) U.S. Cl.
CPC ................. *F02C 7/18* (2013.01); *F01D 9/047* (2013.01); *F01D 25/08* (2013.01); *F02C 7/185* (2013.01)

(58) Field of Classification Search
CPC ............. F02C 7/18; F02C 7/185; F01D 9/047; F01D 25/08; F01D 25/12; F01D 5/00; F01D 5/02; F01D 5/08; F01D 5/081
(Continued)

(56) References Cited

U.S. PATENT DOCUMENTS 3,584,458 A * 6/1971 Wetzler ................. F01D 17/162
415/115
4,616,976 A * 10/1986 Lings ..................... F01D 5/186
415/114
(Continued)

FOREIGN PATENT DOCUMENTS

EP 1 221 536 A2 7/2002
EP 1 607 580 A2 12/2005
(Continued)

OTHER PUBLICATIONS

Ahn et al., "Film cooling from two rows of holes with opposite orientation angles: injectant behavior and adiabatic film cooling effectiveness", *International Journal of Heat and Fluid Flow*, Feb. 1, 2003, pp. 91-99, vol. 24 No. 1.
(Continued)

*Primary Examiner* — Steven Sutherland
(74) *Attorney, Agent, or Firm* — Oliff PLC

(57) ABSTRACT

An end-wall component of the mainstream gas annulus of a gas turbine engine has a cooling arrangement including one or more circumferentially extending rows of ballistic cooling holes through which, in use, dilution cooling air is jetted into the mainstream gas to reduce the mainstream gas temperature adjacent the end-wall. A portion of the cooling holes are first cooling holes angled such that the direction of the dilution cooling air jetted therethrough has, on entry into the mainstream gas annulus, a component in one tangential direction. A portion of the cooling holes are second cooling holes angled such that the direction of the dilution cooling air jetted therethrough has, on entry into the mainstream gas annulus, a component in the opposite tangential direction. The first and second cooling holes are arranged such that the cooling air from jets having entry components in opposing tangential directions collide and coalesce.

8 Claims, 5 Drawing Sheets

(58) Field of Classification Search
USPC .................... 60/782, 785, 806; 415/115, 116
See application file for complete search history.

(56) References Cited

U.S. PATENT DOCUMENTS

| | | | |
|---|---|---|---|
| 5,326,224 A | 7/1994 | Lee et al. | |
| 5,417,545 A * | 5/1995 | Harrogate | ............... F01D 5/186 415/115 |
| 2011/0097191 A1 | 4/2011 | Bunker | |

FOREIGN PATENT DOCUMENTS

| | | |
|---|---|---|
| EP | 1 788 193 A2 | 5/2007 |
| GB | 2 409 210 A | 6/2005 |

OTHER PUBLICATIONS

Feb. 4, 2014 Search Report issued in European Patent Application No. 13 00 5178.
Feb. 25, 2013 Search Report under Section 17 issued in British Patent Application No. GB1219731.5.

* cited by examiner

GAS TURBINE ENGINE END-WALL COMPONENT

FIELD OF THE INVENTION

The present invention relates to an end-wall component of the working gas annulus of a gas turbine engine, the component having a cooling arrangement including one or more rows of ballistic cooling holes through which, in use, dilution cooling air is jetted into the working gas to reduce the working gas temperature adjacent the end-wall.

BACKGROUND OF THE INVENTION

The performance of the simple gas turbine engine cycle, whether measured in terms of efficiency or specific output, is improved by increasing the turbine gas temperature. It is therefore desirable to operate the turbine at the highest possible temperature. For any engine cycle compression ratio or bypass ratio, increasing the turbine entry gas temperature always produces more specific thrust (e.g. engine thrust per unit of air mass flow). However, as turbine entry temperatures increase, the life of an uncooled turbine falls, necessitating the development of better materials and the introduction of internal air cooling.

In modern engines, the high pressure (HP) turbine gas temperatures are now much hotter than the melting point of the blade materials used, and in some engine designs the intermediate pressure (IP) and low pressure (LP) turbines are also cooled. During its passage through the turbine, the mean temperature of the gas stream decreases as power is extracted. Therefore the need to cool the static and rotary parts of the engine structure decreases as the gas moves from the HP stage(s) through the IP and LP stages towards the exit nozzle.

Internal convection and external films are the main methods of cooling the aerofoils. HP turbine nozzle guide vanes (NGV's) consume the greatest amount of cooling air on high temperature engines. HP blades typically use about half of the NGV cooling air flow. The IP and LP stages downstream of the HP turbine use progressively less cooling air.

FIG. 1 shows an isometric view of a conventional HP stage cooled turbine. Block arrows indicate cooling air flows. The stage has NGVs 100 with inner 102 and outer 104 platforms and HP rotor blades 106 downstream of the NGVs. Upstream of the NGVs, a rear inner discharge nozzle (RIDN) 108 and a rear outer discharge nozzle (RODN) 110 are formed by respective sealing rings which bridge the gaps between end-walls (not shown) of the engine combustor and the platforms 102, 104. The RIDN and the RODN take up the relative axial and radial movement between the combustor and the NGVs.

The NGVs 100 and HP blades 106 are cooled by using high pressure air from the compressor that has by-passed the combustor and is therefore relatively cool compared to the working gas temperature. Typical cooling air temperatures are between 800 and 1000 K. Mainstream gas temperatures can be in excess of 2100 K.

The cooling air from the compressor that is used to cool the hot turbine components is not used fully to extract work from the turbine. Extracting coolant flow therefore has an adverse effect on the engine operating efficiency. It is thus important to use this cooling air as effectively as possible.

The radial gas temperature distribution supplied to the turbine from the combustor is relatively uniform from root to tip. This flat profile causes overheating problems to end-walls such as the NGV platforms 102, 104 and the blade platform 112 and shroud 114, which are difficult to cool due to the strong secondary flow fields that exist in these regions. In particular, such overheating can lead to premature spallation of thermal barrier coatings followed by oxidation of parent metal, and thermal fatigue cracking.

Any dedicated cooling flow used to cool the platforms and shroud, when reintroduced into the mainstream gas-path causes mixing losses which have a detrimental effect on the turbine stage efficiency. Thus an alternative approach is to modify the temperature profile over a radial traverse of the mainstream gas annulus by locally introducing relatively large quantities of dilution cooling air at a plane upstream of the NGV aerofoil leading edges, for example at the RIDN 108 and the RODN 110. This ballistic cooling flow penetrates the hot gas stream, due to the high angle at which the coolant is introduced, and mixes vigorously with the gas flow to locally reduce the gas temperature. The resulting peaky radial temperature profile heats up the aerofoil and cools down the end-walls, while maintaining the same average gas temperature into the NGVs.

Conventionally the ballistic flow introduced at the RIDN and RODN enters the mainstream gas-path relatively far upstream of the NGV aerofoil through circumferential rows of holes 116, arranged in a staggered formation in the respective sealing ring. The holes are drilled with a radial orientation such that the cooling air enters the mainstream gas-path in the same radial direction.

With engine cycle gas temperatures rising and combustion temperature profiles becoming flatter, as a consequence of the drive to reduce NOx and $CO_2$ emissions, there is an increasing need to make better use of this cooling air.

SUMMARY OF THE INVENTION

The present invention is at least partly based on the realisation that, while injecting ballistic cooling flows into the mainstream gas annulus in a radial direction can promote flow penetration into the hot gas stream, the mixing which typically results can be excessive and inhibit cooling potential downstream.

Accordingly, the present invention provides in a first aspect an end-wall component of the mainstream gas annulus of a gas turbine engine, the component having a cooling arrangement including one or more circumferentially extending rows of ballistic cooling holes through which, in use, dilution cooling air is jetted into the mainstream gas to reduce the mainstream gas temperature adjacent the end-wall, a portion of the cooling holes being first cooling holes angled such that the direction of the dilution cooling air jetted therethrough has, on entry into the mainstream gas annulus, a component in one tangential direction, and a portion of the cooling holes being second cooling holes angled such that the direction of the dilution cooling air jetted therethrough has, on entry into the mainstream gas annulus, a component in the opposite tangential direction, the first and second cooling holes being arranged such that the cooling air from jets having entry components in opposing tangential directions collide and coalesce.

Advantageously, this collision and coalescence can reduce the momentum of the coolant in the radial direction, allowing the coolant to stay closer to the end-wall surface (e.g. a nozzle guide vane platform surface). Further, an increase in turbulence generated by the coalescing jets can enhance the ability of the coolant to attach to the end-wall surface. Either or both of these effects can help the coolant to be more effective for longer periods, for example reducing the exposure of the end-wall surface to high temperature combustor flows.

The end-wall component may have any one or, to the extent that they are compatible, any combination of the following optional features.

The cooling holes may have diameters of 1 mm or greater, and preferably may have diameters of 1.5 mm or greater. Holes of such diameter can help to pass a relatively high rate of cooling air flow.

The direction of the cooling air jetted through the each hole may, on entry into the mainstream gas annulus, be angled tangentially away from the radial direction at an angle typically in the range from 30° to 60°.

The cooling holes of the or each row may be arranged such that pairs of neighbouring cooling holes are formed, one cooling hole of each pair being a first cooling hole and the other cooling hole of each pair being a second cooling hole, the cooling holes of each pair being angled towards each other.

According to another option, the cooling arrangement may include two or more rows of ballistic cooling holes, the cooling holes being arranged such that, between the or each pair of neighbouring rows, the cooling holes of one row are first cooling holes and the cooling holes of the other row are second cooling holes. In this case, between the or each pair of neighbouring rows, the cooling holes of one row may be circumferentially staggered relative to the cooling holes of the other row.

Typically, the component can be a rear inner or rear outer discharge nozzle sealing ring which bridges a gap between an end-wall of the combustor and a platform of a nozzle guide vane of the high pressure turbine. However, another option is for the component to be an inner or outer platform of a nozzle guide vane of a high pressure turbine (e.g. with the rows of ballistic cooling holes Located upstream of the leading edge of the aerofoil of the nozzle guide vane). Whether the component is a discharge nozzle sealing ring or a nozzle guide vane platform, the engine typically has in mainstream gas flow series a high pressure compressor, a combustor and the high pressure turbine, and the dilution cooling air jetted into the mainstream gas through the ballistic cooling holes can be derived by diverting air compressed by the high pressure compressor away from the combustor and towards the end-wall component as dilution cooling air. The cooling holes of the or each end-wall may then be configured to pass a flow rate of the dilution cooling air corresponding to at least 2%, and preferably at least 3% or 7%, of the air compressed by the high pressure compressor.

Indeed, the present invention provides in a second aspect a method of modifying the temperature profile over a radial traverse of the mainstream gas annulus of a gas turbine engine having in mainstream gas flow series a high pressure compressor, a combustor and a high pressure turbine, the engine further having, at an inner or outer end-wall, an end-wall component which is either (i) a discharge nozzle sealing ring of the first aspect, or (ii) a platform of a nozzle guide vane of the first aspect, the method including:

diverting at least 2%, and preferably at least 3% or 7%, of the air compressed by the high pressure compressor away from the combustor and towards the end-wall component as dilution cooling air; and jetting the dilution cooling air through the ballistic cooling holes of the end-wall component and into the mainstream gas to reduce the mainstream gas temperature adjacent the end-wall.

In the method of the second aspect, the engine may further have, at the other of the inner and outer end-walls, a second end-wall component which is either (i) a discharge nozzle sealing ring of the first aspect, or (ii) a platform of a nozzle guide vane of the first aspect, the method further including:

diverting at least 2%, and preferably at least 3% or 7%, of the air compressed by the high pressure compressor away from the combustor and towards the second end-wall component as further dilution cooling air; and jetting the further dilution cooling air through the ballistic cooling holes of the second end-wall component and into the mainstream gas to reduce the mainstream gas temperature adjacent the other end-wall.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
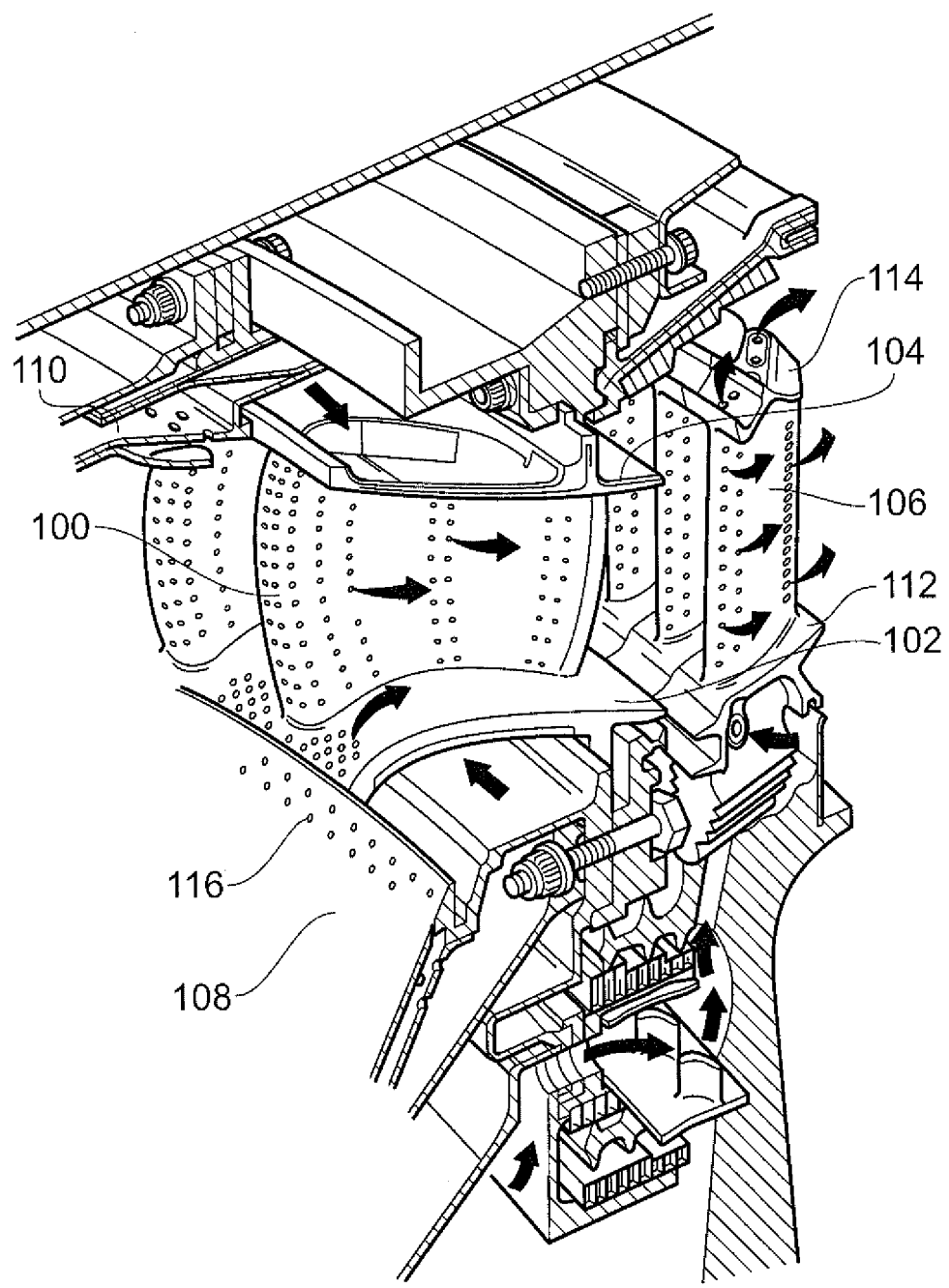
FIG. 1 shows an isometric view of a conventional HP stage cooled turbine.
Figure 2:
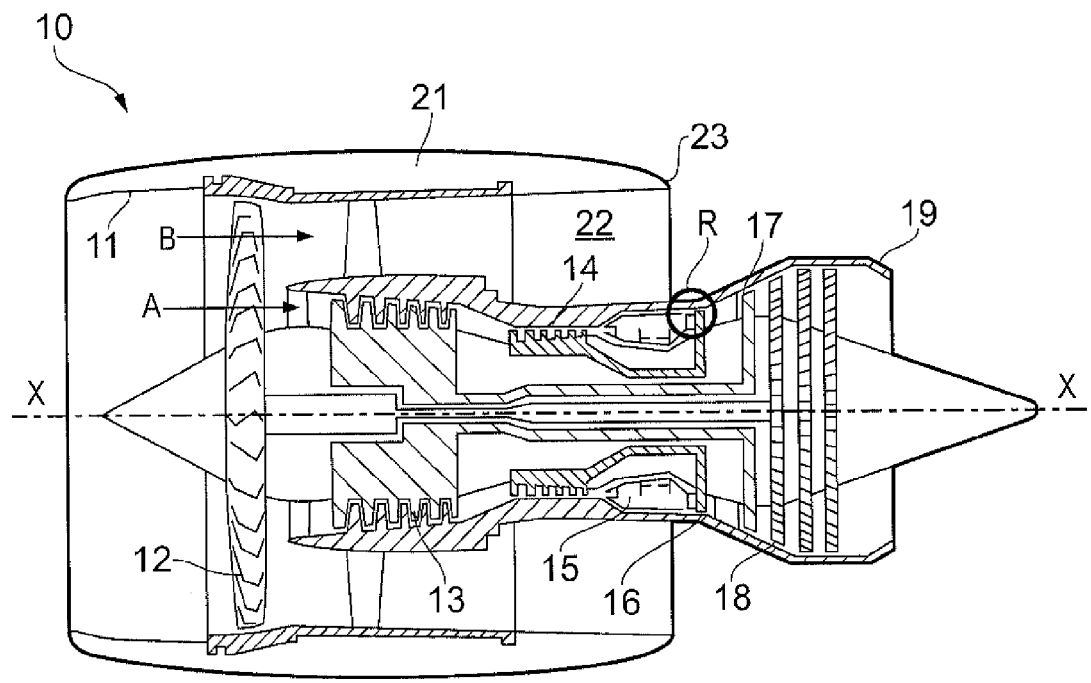
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X, The engine comprises, in axial flow series, an air intake 11, a propulsive fan 12, an intermediate pressure (IP) compressor 13, a high-pressure (HP) compressor 14, a combustor 15, a high-pressure (HP) turbine 16, and intermediate pressure (IP) turbine 17, a low-pressure (LP) turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the IP compressor 13 and a second air flow B which passes through the bypass duct 22 to provide propulsive thrust. The IP compressor 13 compresses the air flow A directed into it before delivering that air to the HP compressor 14 where further compression takes place.

The compressed air exhausted from the HP compressor 14 is directed into the combustor 15 where it is mixed with fuel and the mixture combusted. The resultant hot combustion products then expand through, and thereby drive the HP, IP and LP turbines 16, 17, 18 before being exhausted through the nozzle 19 to provide additional propulsive thrust. The HP, IP and LP turbines respectively drive the HP and IP compressors 14, 13 and the fan 12 by suitable interconnecting shafts.

Figure 3:
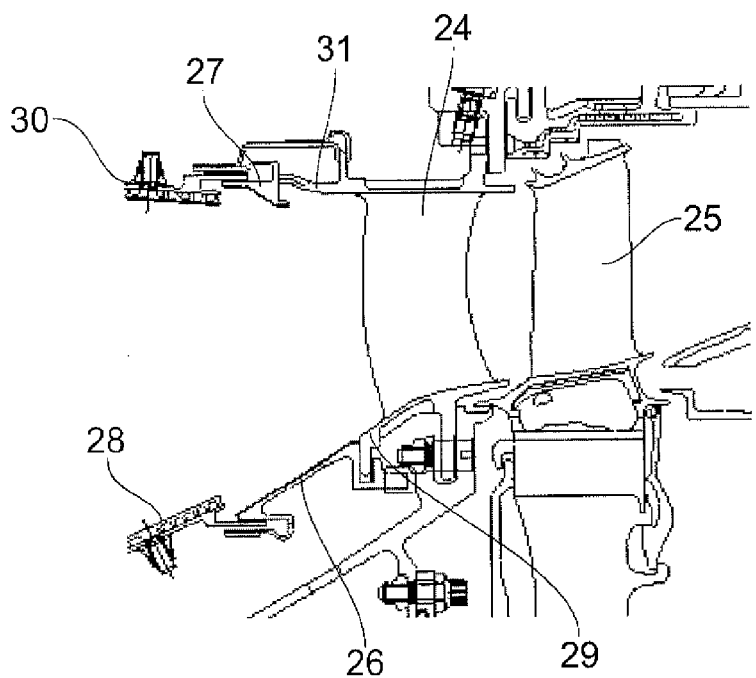
FIG. 3 shows in more detail the circled region labelled R in FIG. 2.

FIG. 3 shows in more detail the circled region labelled R in FIG. 2, between the combustor 15 and the NGVs 24 and turbine blades 25 of the HP turbine 16. A RIDN sealing ring 26 extends across the gap between an inner end-wall 28 of the combustor and NGV segment inner platforms 29, and a RODN sealing ring 27 extends across the gap between an outer end-wall 30 of the combustor and NGV segment outer platforms 31.

Figure 4A:
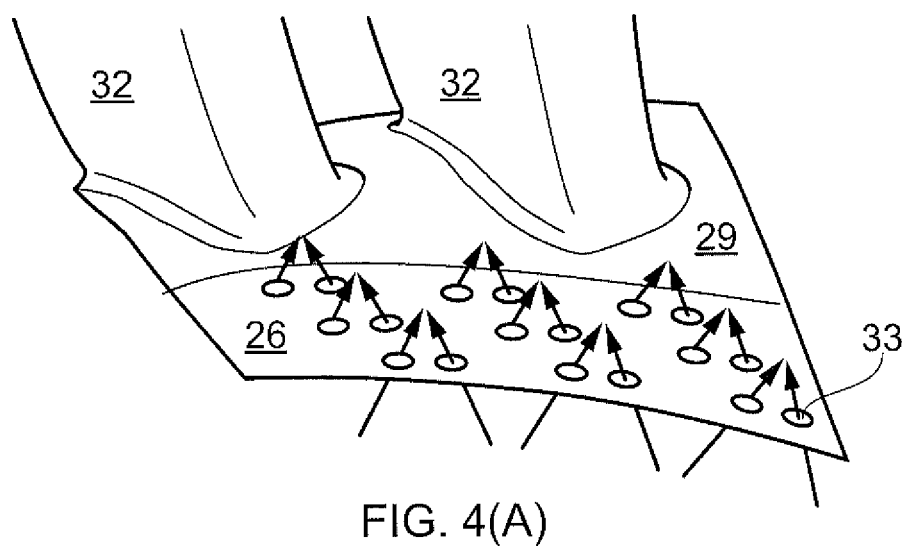
FIGS. 4(a) and (b) show (a) an isometric view of a pair of aerofoils of the NGVs of FIG. 3 and a RIDN ring, and (b) a top view of the RIDN ring.
Figure 4B:
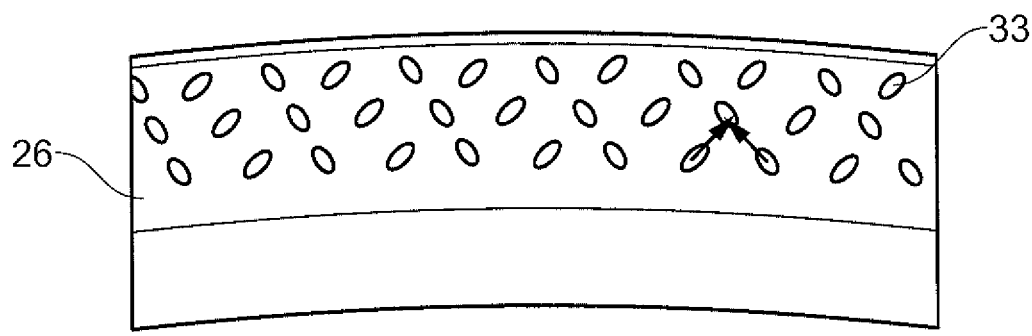

FIG. 4(a) shows an isometric view of a pair of aerofoils 32 of the NGVs 24. An inner platform 29 is located at the root of the NGVs. In front of the inner platform is the RIDN ring 26, which contains three circumferentially extending rows of ballistic cooling holes 33. Similar rows of holes can be formed in the RODN ring 27. FIG. 4(b) shows a top view of the RIDN ring. HP compressor cooling air which bypasses the combustor is jetted through the holes (as indicated by arrows) into the mainstream gas annulus. For example, the amount of cooling air which passes through the holes of the RIDN ring can be 2% or more of the air compressed by the HP compressor, and the amount of cooling air which passes through the corresponding holes of the RODN ring can be 7% or more of the air compressed by the HP compressor. To accommodate such a flow, the holes have diameters which may be greater than 1 mm (1.5 mm is typical for the RIDN ring, and the corresponding holes in the RODN ring may have diameters of around 2 mm). The number of rows can be varied. However, within each row, half the holes are angled in one direction so that the cooling air jetted therethrough has, on entry into the mainstream gas annulus, a component in one tangential direction, and half the holes are angled in the other direction so that the cooling air jetted therethrough has, on entry into the mainstream gas annulus, a component in the other tangential direction. The holes are arranged in pairs with the holes of each pair angled towards each other to produce opposing jet pairs that interact and coalesce close to the platform surface. The holes are preferably angled tangentially in the range 30° to 60° (e.g. at or close to 45°) to produce the opposing jet pairs. The axis of each hole may have only a radial and a tangential component. Alternatively, the axis of each hole may have a radial, a tangential and an axial component (i.e. so that the hole may be inclined in the direction of the mainstream flow). The holes of each pair can be angled tangentially at the same (but opposing) angle, or one may be angled more than the other.

The collision and and coalescence of the jet pairs close to the surface of the inner platform 29, together with the tangential inclination, reduces the momentum of the coolant in a direction normal to the inner platform, allowing the coolant to stay closer to the end-wall. This enables the coolant to be more effective for longer, and reduces the exposure of the platform surface to the high temperature combustor flow. The increase in turbulence generated by the coalescing jets also enhances the ability of the coolant to attach to the platform surface. By having more than one row of holes and by circumferentially staggering the holes of different rows, a more uniform coolant distribution can be achieved.

The improved cooling of the inner platform 29, and the improved cooling of the outer platform 31 when similar rows of holes are formed in the RODN ring 27, can help to reduce coolant flow to plenum chambers formed within the platforms, with attendant improvements in turbine efficiency and specific fuel consumption. Indeed it can be possible to avoid the need for such coolant flows entirely, removing the cost of providing such plenum chambers in the platform castings.

Figure 5A:
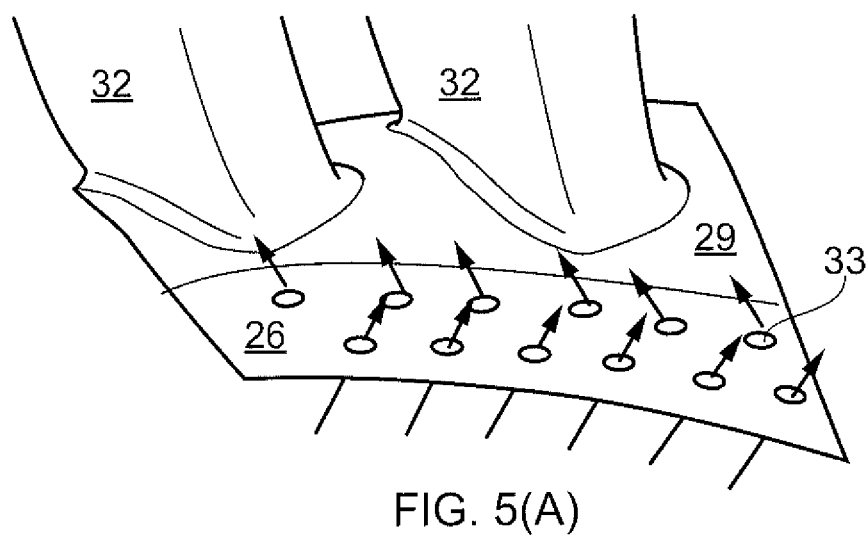
FIGS. 5(a) and (b) show (a) another isometric view of the pair of aerofoils of 4 and a variant of the RIDN ring, and (b) a top view of the variant RIDN ring.
Figure 5B:
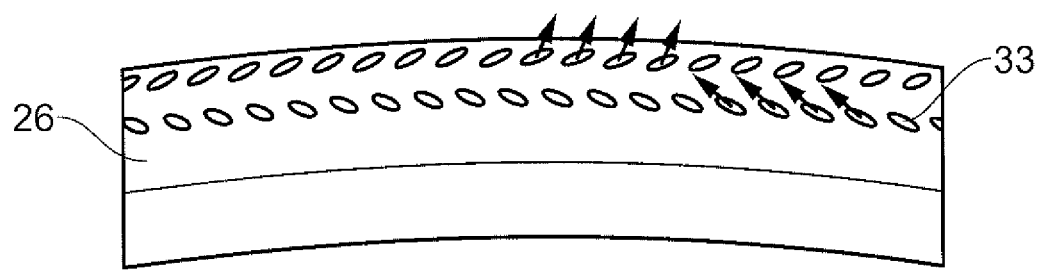

FIG. 5 shows (a) another isometric view of the pair of aerofoils 32 of FIG. 4 and a variant of the RIDN ring 26, and (b) a top view of the variant RIDN ring. There are only two rows of holes 33 in the variant RIDN ring, and all the holes of each ring are angled tangentially (in the range 30° to 60°, e.g. at or close to 45°) in the same direction. However, in the first row they are angled in one tangential direction and in the second row they are angled in the opposite tangential direction. The holes of the first row can be angled tangentially at the same (but opposing) angle as the holes of second row, or one row may be angled more than the other row. As for the configuration of FIG. 4, the cooling holes may also be inclined in the direction of the mainstream flow. As before, the tangential inclination reduces the component of momentum normal to the end-wall and helps to keep the coolant film closer to the platform surface. In addition, the opposing flows from each row collide and coalesce, destroying the swirl and much of the momentum normal to the surface. This benefits the end-wall by keeping the coolant closer to the intended surface. In addition, the increase in turbulence generated by the colliding flows enhances the ability of the coolant to attach to the platform surface.

Figure 6A:
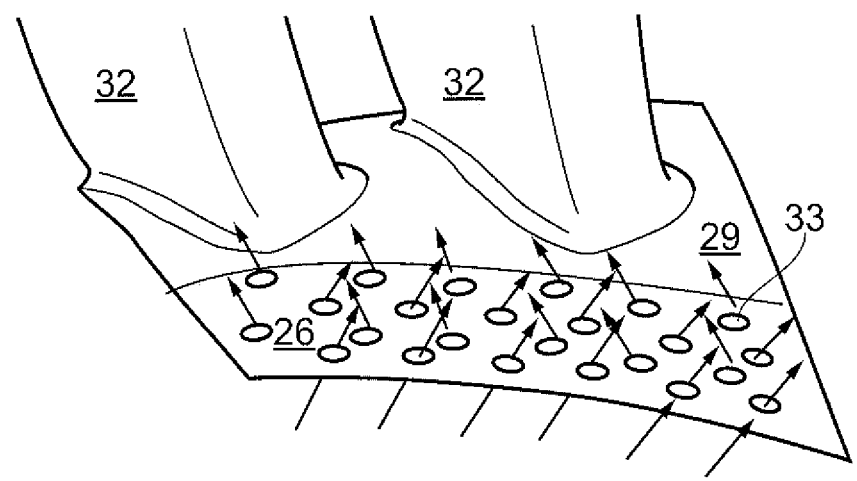
FIGS. 6(a) and (b) show (a) another isometric view of the pair of aerofoils of 4 and a further variant of the RIDN ring, and (b) a top view of the further variant RIDN ring.
Figure 6B:
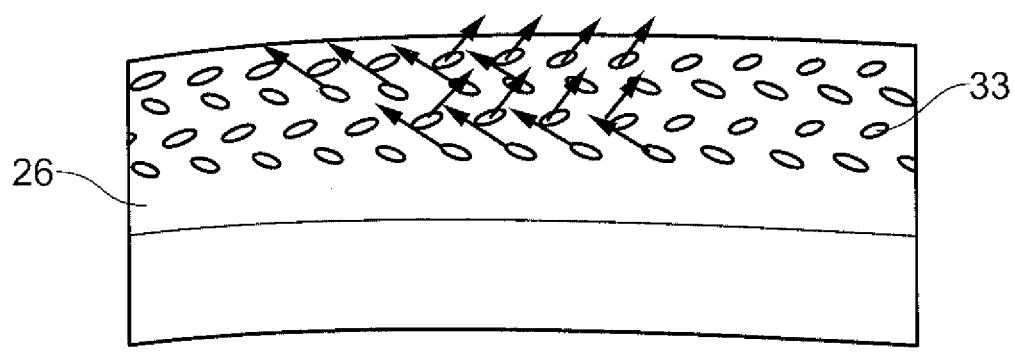

FIG. 6 shows (a) another isometric view of the pair of aerofoils 32 of FIG. 4 and a further variant of the RIDN ring 26, and (b) a top view of the further variant RIDN ring. The further variant is similar to the two row variant of FIG. 5, but is now extended to four rows of holes 33, which together may have the same effective flow area as the two row variant. In the further variant, the first and third rows are inclined tangentially (in the range 30° to 60°, e.g. at or close to 45°) in the opposite direction to the second and fourth rows. The cooling holes in all four rows may be inclined in the direction of the mainstream flow. Adding two more rows while maintaining the same effective flow area can reduce still further the component of momentum normal to the surface. This reduction encourages the coolant flow to remain even closer to the platform which reduces further the exposure of the surface to the high temperature combustor flow.

While the invention has been described in conjunction with the exemplary embodiments described above, many equivalent modifications and variations will be apparent to those skilled in the art when given this disclosure. For example, the cooling holes 33 can be moved from the RIDN 26 and RODN 27 rings and accommodated instead in the inner 29 and outer 31 platforms of the NGVs 24, particularly at a location upstream of the leading edges of the aerofoils 32. Accordingly, the exemplary embodiments of the invention set forth above are considered to be illustrative and not limiting. Various changes to the described embodiments may be made without departing from the spirit and scope of the invention.

The invention claimed is:

1. An end-wall component of a mainstream gas annulus of a gas turbine engine, the end-wall component having:
   a cooling arrangement including one or more circumferentially extending rows of ballistic cooling holes through which, in use, dilution cooling air is jetted into a mainstream gas to reduce a mainstream gas temperature adjacent the end-wall component,
   a portion of the ballistic cooling holes being first ballistic cooling holes angled such that a direction of the dilution cooling air jetted therethrough has, on entry into the mainstream gas annulus, a component in one tangential direction, and
   a portion of the ballistic cooling holes being second ballistic cooling holes angled such that a direction of the dilution cooling air jetted therethrough has, on entry into the mainstream gas annulus, a component in an opposite tangential direction, the first ballistic and second ballistic cooling holes being arranged such that the dilution cooling air from jets having entry components in opposing tangential directions collide and coalesce, wherein the first ballistic and the second ballistic cooling holes are arranged in a same circumferentially extending row.

2. The end-wall component according to claim 1, wherein the ballistic cooling holes have diameters of between 1 mm to 2 mm.

3. The end-wall component according to claim 1, wherein the ballistic cooling holes of the one or more circumferential rows or each of the one or more circumferential rows are arranged such that pairs of neighbouring ballistic cooling holes are formed, one ballistic cooling hole of each pair being a first ballistic cooling hole and another ballistic cooling hole of each pair being a second ballistic cooling hole, the ballistic cooling holes of each pair being angled towards each other.

4. The end-wall component according to claim 1, wherein a gas turbine engine has in mainstream gas flow series a combustor and a high pressure turbine, and wherein the end-wall component is a rear inner or rear outer discharge nozzle sealing ring which bridges a gap between an end-wall of the combustor and a platform of a nozzle guide vane of the high pressure turbine.

5. The end-wall component according to claim 4, wherein the gas turbine engine has in mainstream gas flow series a high pressure compressor, the combustor and the high pressure turbine, and wherein the dilution cooling air jetted into the mainstream gas through the ballistic cooling holes is derived by diverting air compressed by the high pressure compressor away from the combustor and towards the end-wall component as dilution cooling air, the ballistic cooling holes being configured to pass a flow rate of the dilution cooling air corresponding to at least 2% of the air compressed by the high pressure compressor.

6. A method of modifying a temperature profile over a radial traverse of the mainstream gas annulus of a gas turbine engine having in mainstream gas flow series a high pressure compressor, the combustor and the high pressure turbine, the gas turbine engine further having an end-wall component according to claim 4 at an inner or outer end-wall, the method including:
  diverting at least 2% of air compressed by the high pressure compressor away from the combustor and towards the end-wall component as dilution cooling air; and
  jetting the dilution cooling air through the ballistic cooling holes of the end-wall component and into the mainstream gas to reduce the mainstream gas temperature adjacent the end-wall component.

7. The method of modifying the temperature profile over a radial traverse of the mainstream gas annulus of a gas turbine engine having in mainstream gas flow series a high pressure compressor, the combustor and the high pressure turbine, the engine further having a first end-wall component and a second end-wall component each according to claim 6 at inner and outer end-walls respectively, the method including:
  diverting at least 2% of the air compressed by the high pressure compressor away from the combustor and towards the first end-wall component as dilution cooling air;
  jetting the dilution cooling air through the ballistic cooling holes of the first end-wall component and into the mainstream gas to reduce the mainstream gas temperature adjacent the first end-wall component,
  diverting at least 2% of the air compressed by the high pressure compressor away from the combustor and towards the second end-wall component as further dilution cooling air; and
  jetting the further dilution cooling air through the ballistic cooling holes of the second end-wall component and into the mainstream gas to reduce the mainstream gas temperature adjacent the second end-wall component.

8. The end-wall component according to claim 1, wherein a gas turbine engine has a high pressure turbine, and wherein the component is an inner or outer platform of a nozzle guide vane of the high pressure turbine.

\* \* \* \* \*